(12) United States Patent
Mitchell

(10) Patent No.: US 7,701,647 B2
(45) Date of Patent: *Apr. 20, 2010

(54) COMPACT FAST CATADIOPTRIC IMAGER

(75) Inventor: Thomas A. Mitchell, Nazareth, PA (US)

(73) Assignee: Wavefront Research, Inc., Bethlehem, PA (US)

( * ) Notice: Subject to any disclaimer, the term of this patent is extended or adjusted under 35 U.S.C. 154(b) by 334 days.

This patent is subject to a terminal disclaimer.

(21) Appl. No.: 11/754,026

(22) Filed: May 25, 2007

(65) Prior Publication Data

US 2008/0019022 A1    Jan. 24, 2008

Related U.S. Application Data

(63) Continuation-in-part of application No. 10/951,538, filed on Sep. 28, 2004, now Pat. No. 7,224,520.

(51) Int. Cl.
G02B 17/00 (2006.01)

(52) U.S. Cl. .................. 359/731; 359/357

(58) Field of Classification Search .................. 359/357, 359/663, 727, 728, 729, 730, 731
See application file for complete search history.

(56) References Cited

U.S. PATENT DOCUMENTS

| | | | |
|---|---|---|---|
| 4,165,151 A * | 8/1979 | Momiyama | 359/730 |
| 4,264,136 A | 4/1981 | Ogino | 350/444 |
| 4,398,809 A | 8/1983 | Canzek | 350/444 |
| 4,443,068 A | 4/1984 | Itoh | 350/423 |
| 4,456,343 A * | 6/1984 | Canzek | 359/731 |
| 4,482,219 A | 11/1984 | Canzek | 359/730 |
| 4,547,045 A * | 10/1985 | Canzek | 359/731 |
| 4,666,259 A | 5/1987 | Iizuka | 350/444 |
| 4,951,078 A | 8/1990 | Okada | 354/402 |
| 5,802,335 A | 9/1998 | Sturlesi et al. | 359/364 |
| 7,224,520 B2 * | 5/2007 | Mitchell | 359/357 |

* cited by examiner

*Primary Examiner*—Alessandro Amari
(74) *Attorney, Agent, or Firm*—Burns & Levinson LLP; Jacob Erlich; Orlando Lopez

(57) ABSTRACT

A compact, optically fast catadioptric imager. In one embodiment, the catadioptric imager of this invention includes a first group of optical elements optically disposed to receive electromagnetic radiation from an object and having positive optical power, a second group of optical elements, optically disposed between the first group of optical elements and an image plane, having at least one optical surface and having positive optical power, a third group of optical elements, optically disposed between the object and the second group of optical elements, having at least one optical surface and having negative optical power, a fourth group of optical elements substantially centered along an optical axis of said second group of optical elements and having negative optical power, and a fifth group of optical elements having positive optical power.

3 Claims, 4 Drawing Sheets

COMPACT FAST CATADIOPTRIC IMAGER

CROSS REFERENCE TO RELATED APPLICATIONS

This application is a continuation-in-part of U.S. patent application Ser. No. 10/951,538, filed on Sep. 28, 2004, which is incorporated by reference herein.

BACKGROUND OF THE INVENTION

This invention relates generally to catadioptric imagers, and, more particularly, to an optically fast, telecentric catadioptric imager design.

A catadioptric imager is a device comprised of a combination of both refractive and reflective surfaces that is commonly used to image light emitted or reflected by a given object or scene onto a focal plane where it can be readily observed or recorded.

As an example of an application that underscores the need for improved catadioptric imager designs, a hyperspectral imager is considered below.

A hyperspectral imager, or imaging spectrometer, is a device that is commonly used to examine the spectral, or wavelength dependent, content of an object or scene. These devices are typically comprised of an imaging fore-optic system that images light emitted or reflected by a given object or scene onto a slit element that transmits a single line portion from the image of the object or scene. This slit typically serves as the object of a spectrometer optical system that in turn re-images the light transmitted by the slit to another location while dispersing this light according to its wavelength in a direction orthogonal to the orientation of the slit element. In this manner, each slice of the object or scene is decomposed into a two-dimensional data array, and by scanning the object or scene in line-by-line increments, a three-dimensional data cube is formed.

In order to maximize the throughput of optical energy from the imager fore-optics to the spectrometer optical system, it is desirable that the imager be substantially telecentric in image space. A telecentric optical system is one that has its exit pupil located at infinity, and corresponds to the condition where the optical chief ray is parallel to the optical axis in image space (see, for example, Milton Laikin, "Lens Design," ISBN 0-8247-0507-6, p. 265).

Recent developments in compact infrared spectrometers have created a need for compact infrared imagers to be used as fore-optics. These imagers must be optically fast with little or no obscurations, as well as being substantially telecentric in image space in order to provide sufficient throughput to the spectrometer.

Current infrared imager designs are either too large in size, overly vignetted or obscured, or not substantially telecentric enough to serve as imaging fore-optics for use with compact infrared spectrometers in many applications, including but not limited to, unmanned aircraft surveillance and forensic fieldwork.

In the above example, as in most optical systems, alignment of the optical components presents assembly and design challenges. Many of the current catadioptric imager designs present alignment challenges.

There is therefore a need for an optically fast catadioptric imager design that is more compact in physical size than current fast catadioptric imagers.

Furthermore, there is also a need for a compact catadioptric imager design that is optically faster than current compact catadioptric imagers.

Furthermore, there is also a need for an optically fast compact catadioptric imager design that has a smaller degree of obscuration than current compact catadioptric imagers.

Furthermore, there is a need for an optically fast compact catadioptric imager design that is unvignetted.

Furthermore, there is also a need for an optically fast compact catadioptric imager design that is telecentric in image space.

Furthermore, there is also a need for a catadioptric imager design that is easier to align than current catadioptric imagers.

Still further, there is also a need for a catadioptric imager design that provides a combination of the characteristics described above with superior trade-offs than have been previously attainable.

BRIEF SUMMARY OF THE INVENTION

The needs set forth above as well as further and other needs and advantages of the present invention are achieved by the embodiments of the invention described herein below.

An optically fast, telecentric catadioptric imager is disclosed.

In one embodiment, the catadioptric imager of this invention includes a first group of optical elements optically disposed to receive electromagnetic radiation from a source, having at least one refractive optical element and having positive optical power, a second group of optical elements optically disposed between the first group of optical elements and an image plane, having at least one optical surface and having positive optical power, a third group of optical elements optically disposed between the object and the second group of optical elements and substantially centered with respect to the first group of optical elements, having at least one optical surface and having negative optical power, a fourth group of optical elements substantially centered with respect to the second group of optical elements, having at least one refractive optical element and having negative optical power, and a fifth group of optical elements having at least one refractive optical element and having positive optical power. The at least one optical surface of the second group of optical elements is a reflective surface and the at least one optical surface of the third group of optical elements is also a reflective surface. The fifth group of optical elements is optically disposed between the fourth group of optical elements and the image plane and the fourth group of optical elements is optically disposed between the third group of optical elements and the fifth group of optical elements.

Conventional infrared imaging spectrometers typically use three-mirror anastigmats (TMAs) as imaging fore-optics, which are limited in their compactness due to the inherent obscuration effect of mirrors. In this invention, an improved catadioptric design form allows for the imaging lens to be folded upon itself, and the elements are arranged such that the obscuration of the optical rays are substantially minimized while maintaining telecentricity in image space without vignetting. This provides several advantages including, but not limited to, a high optical throughput and an improved overall compactness of the system.

For a better understanding of the present invention, together with other and further objects thereof, reference is made to the accompanying drawings and detailed description and its scope will be pointed out in the appended claims.

DETAILED DESCRIPTION OF THE INVENTION

An optically fast, telecentric catadioptric imager is disclosed hereinbelow.

Figure 1:
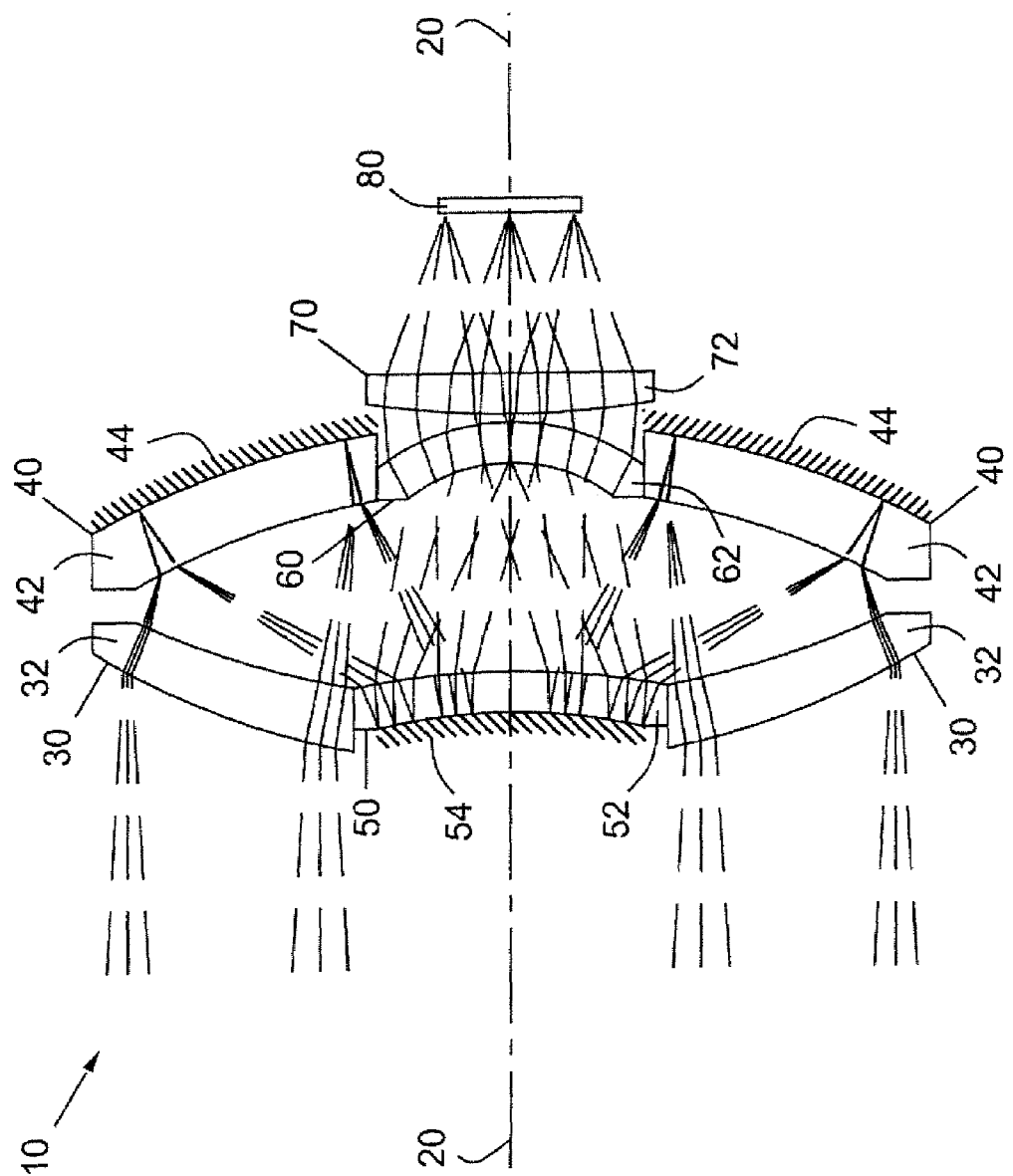
FIG. 1 is a schematic sectional view of an embodiment of a compact fast catadoptric imager of this invention.

Reference is made to FIG. 1, which is a schematic sectional view of an embodiment of this invention 10, taken along the optical axis 20, the optical prescription for which is given in Table 1. In the operation of this embodiment, electromagnetic radiation, typically in the ultraviolet, visible, and/or infrared bands, hereinafter referred to generally as light, emitted or reflected by a given object, either real or virtual, hereinafter also referred to as a source, is incident upon a first, or hereinafter termed "corrector", group of optical elements 30. This corrector element group is similar to that of the Bouwers and Maksutov imaging systems, and is comprised of a refractive element or combination of refractive elements, in this embodiment consisting of element 32, having a combined positive or convergent optical power. A portion of the light that is transmitted by the corrector group 30 is next incident upon a second, or hereinafter termed "primary mirror", group of optical elements 40 comprised of a refractive element or combination of refractive elements, having at least one reflecting optical surface, and having a combined positive or convergent optical power. In this embodiment, the primary mirror group 40 consists of element 42, the image-most side optical surface of which serves as the reflecting surface 44. A portion of the light that is reflected by the primary mirror group 40 is next incident upon a third, or hereinafter termed "secondary mirror", group of optical elements 50 comprised of a refractive element or combination of refractive elements, having at least one reflecting optical surface, and having a combined negative or divergent optical power. In this embodiment, the secondary mirror group 50 consists of element 52, the object most side optical surface of which serves as the reflecting surface 54. The secondary mirror group 50 is located substantially near the axial position of the corrector group 30 (also referred to as being substantially centered with respect to of the first group of optical elements 30), and may or may not include the central portion of the corrector group 30 or any portion thereof. A portion of the light that is reflected by the secondary mirror group 50 is next incident upon a fourth, or hereinafter termed "waist", group of optical elements 60 comprised of a refractive element or combination of refractive elements, in this embodiment consisting of element 62, having a combined negative or divergent optical power. The waist group, 60 is located substantially near the axial position of the primary mirror group 40 (also referred to as being substantially centered with respect to of the second group of optical elements 40), and may or may not contain the central portion of the refractive elements of the primary mirror group 40 or any portion thereof. A portion of the light that is transmitted by the waist group 60 is next incident upon a fifth, or hereinafter termed "telecentrating", group of optical elements 70 comprised of a refractive element or combination of refractive elements, in this embodiment consisting of element 72, having a combined positive or convergent optical power and substantially focuses the transmitted light onto an image plane 80. In some applications, a CCD array, phosphorescent screen, photographic film, microbolometer array, or other means of detecting light energy, hereinafter referred to generally as a detecting element, is substantially located at the image plane 80.

In the present invention, the overall system size is reduced by decreasing the axial separation between the corrector group 30 and the primary mirror group 40. Additionally, the system obscuration in the present invention is reduced by decreasing the footprint of the un-vignetted ray bundles for all desired field positions at the secondary mirror group 50 relative to the corresponding footprint at the corrector group 30. These two conditions require that the optical power of the primary mirror group 40 be made significantly more positive or convergent than previous design forms. The optical aberrations introduced by this increase in optical power, particularly for optically fast systems, can be partially balanced through the addition of one or more aspheric terms to one or more of the optical surfaces, in this embodiment consisting of a fourth and a sixth order aspheric term on the reflective surface 54 of the secondary mirror group 50.

Additionally, in order to maintain this reduction in system obscuration, the negative or divergent optical power of the secondary mirror group must be limited such that the un-vignetted optical ray bundle for all desired field positions at the waist group 60 are kept small compared to the corresponding footprint at the primary mirror group 40. Furthermore, in order to provide a significant amount of back focal distance between the telecentrating group 70 and the image plane 80, the optical power of the waist group 60 must be negative or divergent in order to expand the optical ray bundle once it has cleared the axial position of the primary mirror group 40. Image space telecentricity is then substantially accomplished by making the telecentrating group positive or convergent in optical power such that the optical chief ray is substantially parallel to the optical axis in image space, and this net positive or convergent power further serves to increase the optical speed of the imaging system.

In combination, this design form results in a more compact optical imager with an increased degree of optical throughput, while enabling image space telecentricity. While the embodiment 10 of the present invention described above provides an un-vignetted optical imaging system, other embodiments of the present invention allow for varying degrees of vignetting in order to improve the overall image quality of the system or to relax system constraints such as the optical power of the primary mirror group 40. Similarly, while the telecentrating group 70 in the embodiment 10 of the present invention is typically used to provide image space telecentricity, the optical power of this group may be increased or decreased in other embodiments of the present invention in order to provide, for example, an increase in either optical system speed or spatial imaging field.

Figures 2A, 2B, 2C:
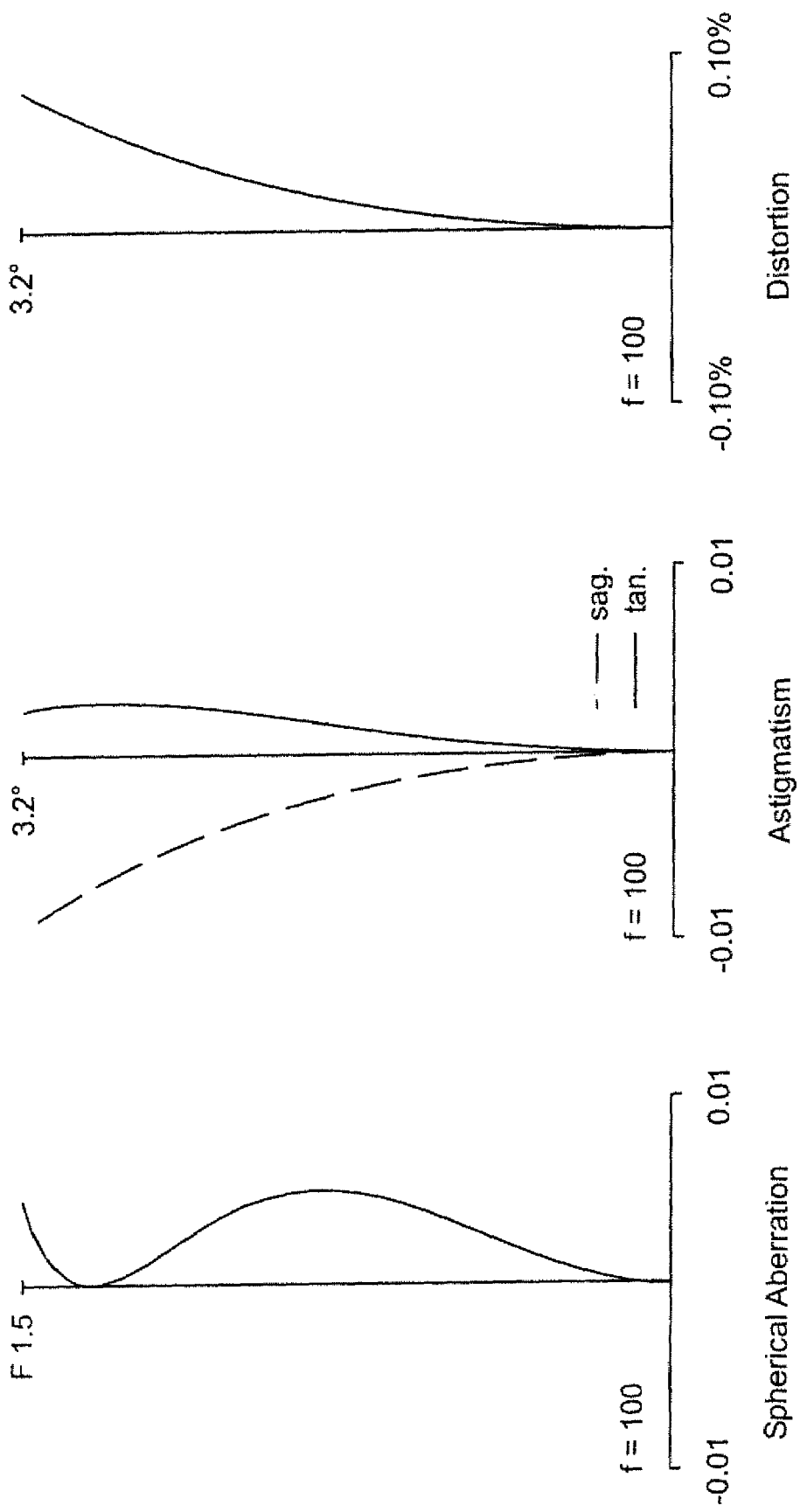
FIGS. 2A, 2B, and 2C are graphical plots of the spherical aberration, astigmatism, and distortion respectively, of the embodiment of this invention illustrated in FIG. 1.

Reference is made to FIGS. 2A-2C, which are graphical plots of the spherical aberration, astigmatism, and distortion respectively of this same embodiment 10 and illustrate the optical performance of the system.

TABLE 1

$f = 100, 2 = 6.4°$

| Element Reference | | Radius of Curvature | Axial Distance | Material |
|---|---|---|---|---|
| 30 | { | 68.300 | 5.828 | GERMANIUM |
|  |  | 75.697 | 18.997 |  |
| 40 | { |  −66.238 | 5.828 | GERMANIUM |
|  | 42 | −74.563 | −5.828 | MIRROR |

TABLE 1-continued $f = 100, 2\omega = 6.4°$

| Element Reference | | | Radius of Curvature | Axial Distance | Material |
|---|---|---|---|---|---|
| 50 | { | 52 | −66.238 | −16.382 | GERMANIUM |
|  |  |  | −68.924 | −3.643 | GERMANIUM |
|  |  |  | −49.439 * | 3.643 | MIRROR |
|  |  |  | −68.924 | 18.568 | GERMANIUM |
| 60 | { |  | −14.473 | 3.643 | GERMANIUM |
|  |  |  | −18.853 | 0.729 |  |
| 70 | { |  | 80.072 | 3.643 | GERMANIUM |
|  |  |  | Infinity | 14.318 |  |

* General aspheric surface (A4 = 6.951e−7, A6 = 3.838e−9)

Figure 3:
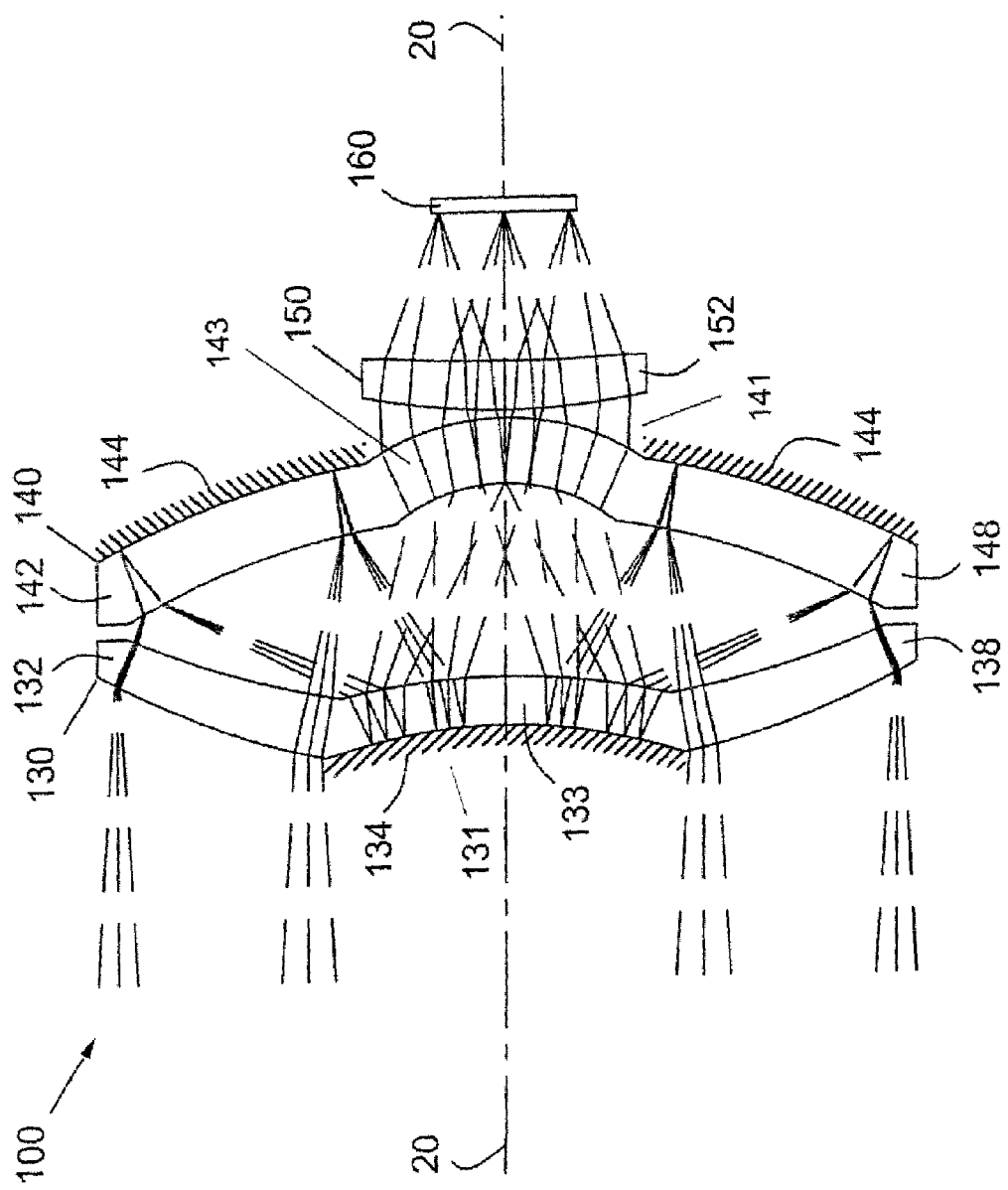
FIG. 3 is a schematic sectional view of another embodiment of a compact fast catadoptric imager of this invention.

Reference is made to FIG. 3, which is a schematic sectional view of a further embodiment of this invention 100, taken along the optical axis 20, the optical prescription for which is given in Table 2. In the operation of this embodiment, light emitted or reflected by a source is incident upon a corrector group of optical elements 130 comprised of a refractive element or combination of refractive elements, in this embodiment consisting of element 132, which comprises the outer portion of the single-piece structure 138, having a combined positive or convergent optical power. A portion of the light transmitted by the corrector group 130 is next incident upon a primary mirror group of optical elements 140 comprised of a refractive element or combination of refractive elements, having at least one reflecting optical surface, and having a combined positive or convergent optical power. In this embodiment, the primary mirror group consists of element 142, which comprises the outer portion of the single-piece structure 148, the image-most side optical surface of which serves as the reflecting surface 144. A portion of the light reflected by the primary mirror group 140 is next incident upon a secondary mirror group of optical elements 131 comprised of a refractive element or combination of refractive elements, having at least one reflecting optical surface, and having a combined negative or divergent optical power. In this embodiment, the secondary mirror group 131 consists of element 133, which comprises the central portion of the single-piece structure 138, the object-most side optical surface of which serves as the reflecting surface 134. A portion of the light that is reflected by the secondary mirror group 131 is next incident upon a waist group of optical elements 141 comprised of a refractive element or combination of refractive elements, in this embodiment consisting of element 143, which comprises the central portion of the single-piece structure 148, having a combined negative or divergent optical power. A portion of the light that is transmitted by the waist group 141 is next incident upon a telecentrating group of optical elements 150 comprised of a refractive element or combination of refractive elements, in this embodiment consisting of element 152, having a combined positive or convergent optical power and substantially focuses the transmitted light onto an image plane 160. In some applications, a CCD array, phosphorescent screen, photographic film, microbolometer array, or other means of detecting light energy, hereinafter referred to generally as a detecting element, is substantially located at the image plane 160.

In the embodiment of the catadioptric imager of this invention illustrated in FIG. 3, the alignment requirements of the system are reduced by combining the corrector element group or any portion thereof, and the secondary mirror group or any portion thereof, into a single-piece structure such that the central portion of the combined group may or may not have a different curvature than the outer portion. Similarly, the primary mirror group or any portion thereof, and the waist element group or any portion thereof, may be combined to form a single-piece structure such that the central portion of the combined group may or may not have a different curvature than the outer portion Additionally, the image-most side edge of the corrector element group and the object-most side edge of the primary mirror group may be placed in contact with one another to further reduce the alignment requirements of the system.

TABLE 2

$f = 100, 2\omega = 6.4°$

| Element Reference | | | Radius of Curvature | Axial Distance | Material |
|---|---|---|---|---|---|
| 130 | { |  | 68.502 | 5.833 | GERMANIUM |
|  |  |  | 78.292 | 17.439 |  |
| 140 | { | 142 | −62.400 | 5.833 | GERMANIUM |
|  |  |  | −70.498 | −5.833 | MIRROR |
|  |  |  | −62.400 | −14.368 | GERMANIUM |
| 130 | { | 132 | −56.983 | −4.374 | GERMANIUM |
|  |  |  | −42.422 * | 4.374 | MIRROR |
|  |  |  | −56.983 | 17.219 | GERMANIUM |
| 140 | { |  | −14.351 | 5.833 | GERMANIUM |
|  |  |  | −20.567 | 0.729 |  |
| 150 | { |  | 57.601 | 4.374 | GERMANIUM |
|  |  |  | 159.082 | 13.231 |  |

* General aspheric surface (A4 = 9.563e−7, A6 = 4.073e−9)

In the embodiments shown in FIGS. 1 and 3, the catadioptric imager of this invention includes first optical means (30 in FIG. 1 and 130 in FIG. 3) for receiving electromagnetic radiation from a source and transmitting and converging a portion of the electromagnetic radiation received from the source, second optical means (40 in FIG. 1 and 140 in FIG. 3) for receiving electromagnetic radiation from the first optical means and reflecting and converging a portion of the electromagnetic radiation received from the first optical means, third optical means (50 in FIG. 1 and 131 in FIG. 3) for receiving electromagnetic radiation from the second optical means and reflecting and diverging a portion of the electromagnetic radiation received from the second optical means, fourth optical means (60 in FIG. I and 141 in FIG. 3) for receiving electromagnetic radiation from the third optical means and transmitting and diverging a portion of the electromagnetic radiation received from the third optical means, and, fifth optical means (70 in FIG. 1 and 150 in FIG. 3) for receiving electromagnetic radiation from the fourth optical means and transmitting and focusing, at an image plane, a portion of the electromagnetic radiation received from the fourth optical means.

Figure 4:
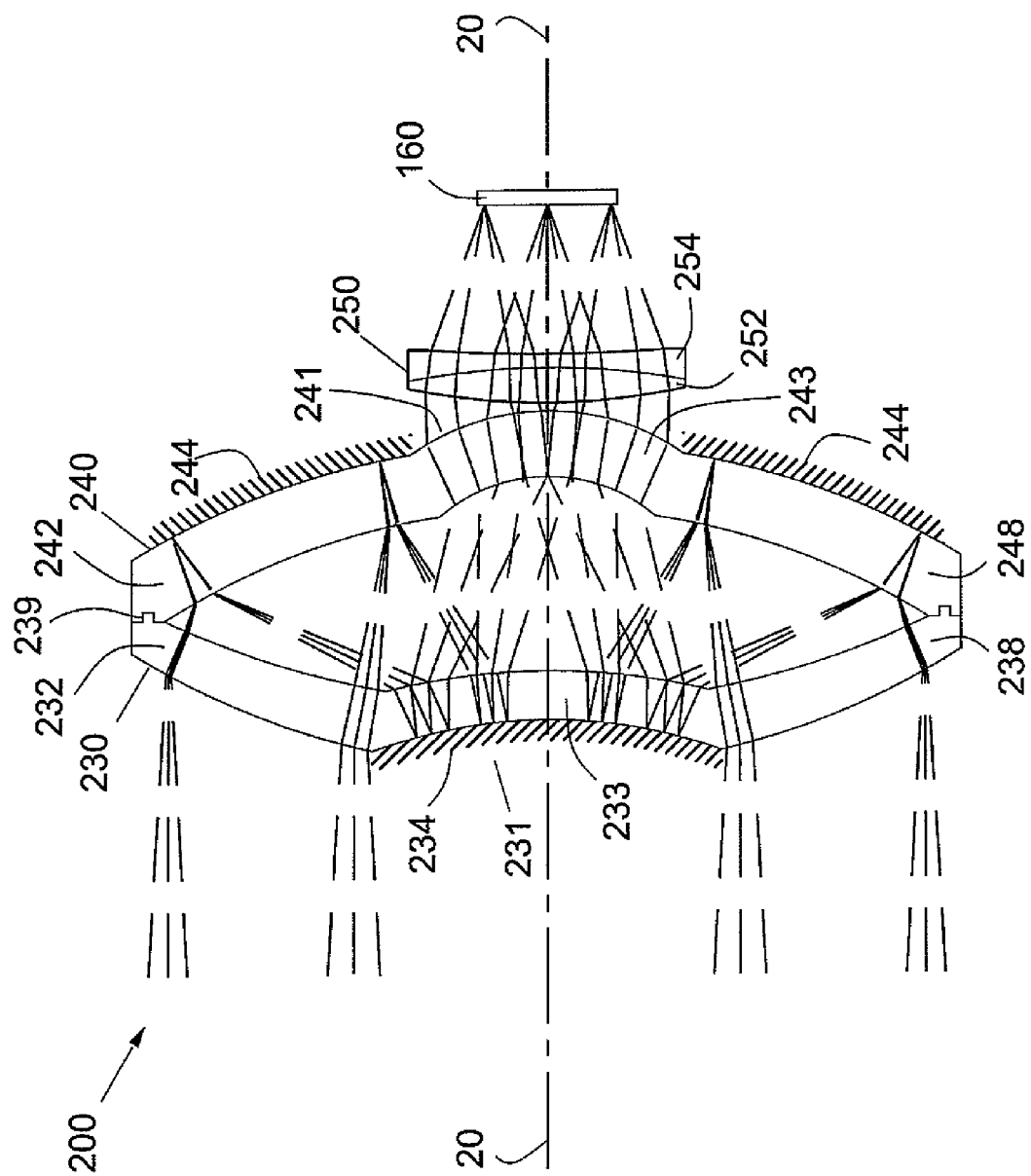
FIG. 4 is a schematic sectional view of yet another embodiment of a compact fast catadoptric imager of this invention.

Reference is made to FIG. 4, which is a schematic sectional view of a further embodiment of these teachings 200, taken along the optical axis 20. In the operation of this embodiment light emitted or reflected by a source is incident upon a corrector group of optical elements 230 comprised of a refractive element or combination of refractive elements, in this embodiment consisting of element 232, which comprises the outer portion of the single-piece structure 238, having a combined positive or convergent optical power. A portion of the light transmitted by the corrector group 230 is next incident upon a primary mirror group of optical elements 240 comprised of a refractive element or combination of refractive elements, having at least one reflecting optical surface, and having a combined positive or convergent optical power. In this embodiment, the primary minor group consists of element 242, which comprises the outer portion of the single-piece structure 248, the image-most side optical surface of which serves as the reflecting surface 244. A portion of the light reflected by the primary mirror group 240 is next incident upon a secondary mirror group of optical elements 231 comprised of a refractive element or combination of refractive elements, having at least one reflecting optical surface, and having a combined negative or divergent optical power. In this embodiment, the secondary mirror group 231 consists of element 233, which comprises the central portion of the single-piece structure 238, the object-most side optical surface of which serves as the reflecting surface 234. A portion of the light that is reflected by the secondary mirror group 231 is next incident upon a waist group of optical elements 241 comprised of a refractive element or combination of refractive elements, in this embodiment consisting of element 243, which comprises the central portion of the single-piece structure 248, having a combined negative or divergent optical power. A portion of the light tat is transmitted by the waist group 241 is next incident upon a telecentrating group of optical elements 250 comprised of a refractive element or combination of refractive elements, in this embodiment consisting of elements 252 and 254, having a combined positive or convergent optical power and substantially focuses the transmitted light onto an image plane 160. In some applications, a CCD array, phosphorescent screen, photographic film, microbolometer array, or other means of detecting light energy, hereinafter referred to generally as a detecting element, is substantially located at the image plane 160.

In the embodiment of the catadioptric imager of this invention illustrated in FIG. 4, the alignment requirements of the system are further reduced by introducing mated features 239*a*, 239*b* into the single-piece structures 238 (239*a* in one single piece structure 238) and 248 (239*b* in the other single piece structure 248) such that their relative placement and orientation (alignment)is controlled by placing them in contact with one another. The features 239*a* in the first single piece structure 238 (which are mated to the features 239*b* in the second single piece structure 248 constituted first means for alignment, while the features 239*b* in the second single piece structure 248 constitute second means for alignment, the first and second means being adapted to substantially mate to each other.

It should be noted that although the reflecting surface in the primary mirror group and the reflecting surface in the secondary mirror group are located in one configuration in the embodiments shown, other embodiments are possible. Examples include, but are not limited to, embodiments in which the reflecting surface of the primary mirror group is the surface proximate to the corrector group and/or the reflecting surface of the secondary mirror group is the surface proximate to the primary mirror group.

It should be noted that other embodiments of the catadioptric imager of this invention are also possible, in which features of the embodiments of FIGS. 1 and 3 are combined.

It should be noted that, although the embodiments described in Tables 1 and 2 utilize the same material for the refractive optical elements, this invention is not limited to designs utilizing the same material for the refractive optical elements and embodiments of this invention are possible in which different materials are used for different refractive optical elements.

Although the invention has been described with respect to various embodiments, it should be realized this invention is also capable of a wide variety of further and other embodiments within the spirit and scope of the appended claims.

What is claimed is:

1. A catadioptric imager comprising:
   a first refractive optical element optically disposed to receive electromagnetic radiation from an object and having positive optical power;
   a first group of optical elements comprising a refractive element and one optical reflective surface; said first group of optical elements being optically disposed between said first refractive optical element and an image plane and having positive optical power; the optical reflective surface of the group of optical elements being located proximate to the image plane;
   a second group of optical elements comprising a refractive element and one optical reflective surface and having negative optical power; said second group of optical elements being substantially centered with respect to said first refractive optical element and optically disposed between the source and said first group of optical elements; said second group of optical elements comprising a portion of a single-piece structure, said single-piece structure also comprising said first refractive optical element; said optical reflective surface of said second group of optical elements being disposed proximate to the source;
   a second refractive optical element substantially centered with respect to said first group of optical elements and having negative optical power; said second refractive optical element comprising of a portion of another single-piece structure, said another single-piece structure also comprising said first group of optical elements;
   said single-piece structure comprising first means for alignment;
   said another single-piece structure comprising second means for alignment; said first and said second means for alignment being adapted to substantially mate to each another; and,
   a third refractive group of optical element having at least one element and having positive optical power;
   said third refractive group of optical element being optically disposed between said second refractive optical element and the image plane;
   said second refractive optical element being optically disposed between said second group of optical elements and said third refractive optical element.

2. A catadioptric imager comprising:
   a first refractive optical element optically disposed to receive electromagnetic radiation from an object and having positive optical power;
   a first group of optical elements comprising a refractive element and one optical reflective surface; said first group of optical elements being optically disposed between said first refractive optical element and an image plane and having positive optical power; the optical reflective surface of the group of optical elements being located proximate to the image plane;
   a second group of optical elements comprising a refractive element and one optical reflective surface and having negative optical power; said second group of optical elements being substantially centered with respect to said first refractive optical element and optically disposed between the source and said first group of optical elements; said second group of optical elements comprising a portion of a single-piece structure, said single-piece structure also comprising said first refractive optical element; said optical reflective surface of said second group of optical elements being disposed proximate to the source;

a second refractive optical element substantially centered with respect to said first group of optical elements and having negative optical power; said second refractive optical element comprising of a portion of another single-piece structure, said another single-piece structure also comprising said first group of optical elements; and, a third refractive group of optical element having at least one element and having positive optical power;

said third refractive group of optical element being optically disposed between said second refractive optical element and the image plane;

said second refractive optical element being optically disposed between said second group of optical elements and said third refractive optical element;

said single piece structure and said another single piece structure comprising mated alignment features disposed at proximate ends of said single piece structure and said another single piece structure;

one of said mated alignment features comprising a protruding component disposed on one of said single piece structure and said another single piece structure; another one of said mated alignment features comprising an indentation disposed on another one of said single piece structure and said another single piece structure; said indentation being located to receive said protruding component.

3. The catadioptric imager of claim 2 wherein said at least one element in said third refractive group comprises at least two elements.

* * * * *